United States Patent
Ioffe et al.

(10) Patent No.: US 12,133,152 B2
(45) Date of Patent: Oct. 29, 2024

(54) SYSTEMS AND METHODS FOR EMERGENCY SERVICE ACCESS BY REDUCED CAPABILITY RADIO FREQUENCY DEVICES

(71) Applicant: Apple Inc., Cupertino, CA (US)

(72) Inventors: Anatoliy S Ioffe, Sunnyvale, CA (US); Ronald W Dimpflmaier, Los Gatos, CA (US); Alexander Sayenko, Munich (DE); Fucheng Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/900,665

(22) Filed: Aug. 31, 2022

(65) Prior Publication Data

US 2023/0007461 A1 Jan. 5, 2023

Related U.S. Application Data

(63) Continuation of application No. 17/589,410, filed on Jan. 31, 2022.
(Continued)

(51) Int. Cl.
*H04W 76/50* (2018.01)
*H04W 4/90* (2018.01)
(Continued)

(52) U.S. Cl.
CPC ............. *H04W 4/90* (2018.02); *H04W 36/08* (2013.01); *H04W 74/0841* (2013.01); *H04W 76/50* (2018.02)

(58) Field of Classification Search
CPC ... H04W 4/90; H04W 36/08; H04W 74/0841; H04W 76/50; H04B 1/40
See application file for complete search history.

(56) References Cited

U.S. PATENT DOCUMENTS 8,594,616 B2 11/2013 Gusikhin
11,470,526 B2 * 10/2022 Ke ......................... H04W 48/18
(Continued)

FOREIGN PATENT DOCUMENTS

| CN | 112399524 A | 2/2021 |
|---|---|---|
| WO | 2010120689 A2 | 10/2010 |
| WO | 20100120689 A2 | 10/2010 |

OTHER PUBLICATIONS

Vivo et al., "Identification and Access Restrictions for RedCap UEs," 3rd Generation Partnership Project Mobile Competence Centre, May 11, 2021, 4 pages.
(Continued)

*Primary Examiner* — Blane J Jackson
(74) *Attorney, Agent, or Firm* — Fletcher Yoder, P.C.

(57) ABSTRACT

An electronic device may transmit a communication request to a base station having an indication of a number of its receive branches and an indication of whether the communication request is designated as an urgent service fulfillment. The base station may delay a denial of the communication request until receiving the indication of whether the communication request is designated as using the urgent service fulfillment to reduce a likelihood of prematurely rejecting the communication request. The base station may also handover the communication request to a base station that supports the urgent service fulfillment. The base station may also be barred from transferring the user equipment to
(Continued)

a frequency layer preferred by the base station when the communication request of the user equipment is designated as an urgent service fulfillment.

20 Claims, 8 Drawing Sheets

Related U.S. Application Data

(60) Provisional application No. 63/196,550, filed on Jun. 3, 2021.

(51) Int. Cl.
*H04W 36/08* (2009.01)
*H04W 74/0833* (2024.01)

(56) References Cited

U.S. PATENT DOCUMENTS

| | | | |
|---|---|---|---|
| 2011/0287776 | A1 | 11/2011 | Vujcic |
| 2016/0150566 | A1 | 5/2016 | Lee et al. |
| 2019/0059121 | A1* | 2/2019 | Takeda ................. H04W 76/10 |
| 2021/0051571 | A1 | 2/2021 | Xu et al. |
| 2021/0076384 | A1 | 3/2021 | MolavianJazi |
| 2021/0258951 | A1 | 8/2021 | Sakhnini |
| 2021/0352466 | A1* | 11/2021 | Hu .................... H04W 74/0833 |
| 2022/0124567 | A1* | 4/2022 | Choe ................. H04W 36/0061 |
| 2022/0312530 | A1* | 9/2022 | Turtinen ............... H04W 76/19 |
| 2022/0394450 | A1* | 12/2022 | Ioffe ....................... H04W 4/90 |
| 2023/0092324 | A1* | 3/2023 | Seidel .................. H04W 48/18 |
| | | | 370/329 |

OTHER PUBLICATIONS

Moderator (Apple), "FL summary #4 for reduced number of Rx branches for RedCap," 3rd Generation Partnership Project Mobile Competence Centre, May 28, 2021, 33 pages.

Extended European Search Report for Application No. 22195578.4, 8 pages.

Partial European Search Report for EP Application No. 22171534 dated Nov. 3, 2022 (11 pgs).

Bergman, Johan; Revised WID on Support of reduced capability NR devices; 3GPP TSG RAN Meeting #91e; Mar. 22, 2021; 6 pages.

Baker, Matthew; LS on Unified Access Control (UAC) for RedCap; 3GPP TSG RAN Meeting #91e; Mar. 22, 2021; 1 page.

3rd Generation Partnership Project; Technical Specification Group Radio Access Network; NR; Radio Resource Control (RRC) protocol specification (Release 16); Mar. 2021; 949 pages.

3rd Generation Partnership Project; Technical Specification Group Radio Access Network; NR;User Equipment (UE) procedures in Idle mode and RRC Inactive state (Release 16); Mar. 2021; 39 pages.

3rd Generation Partnership Project; Technical Specification Group Radio Access Network; NR; NR and NG-RAN Overall Description; Stage 2 (Release 16); Mar. 2021; 151 pages.

3rd Generation Partnership Project;Technical Specification Group Radio Access Network; NR; Medium Access Control (MAC) protocol specification, (Release 16); Mar. 2021; 157 pages.

Office Action for Chinese Patent Application No. 202211102716.3, dated May 10, 2024; 8 pgs.

\* cited by examiner

SYSTEMS AND METHODS FOR EMERGENCY SERVICE ACCESS BY REDUCED CAPABILITY RADIO FREQUENCY DEVICES

CROSS-REFERENCE TO RELATED APPLICATIONS

This application is a continuation of a U.S. patent application Ser. No. 17/589,410, filed Jan. 31, 2022 and entitled "SYSTEMS AND METHODS FOR EMERGENCY SERVICE ACCESS BY REDUCED CAPABILITY RADIO FREQUENCY DEVICES," which claims priority to U.S. Provisional Application No. 63/196,550, filed Jun. 3, 2021, entitled "SYSTEMS AND METHODS FOR EMERGENCY SERVICE ACCESS BY REDUCED CAPABILITY RADIO FREQUENCY DEVICES," each of which is incorporated herein by reference in its entirety for all purposes.

BACKGROUND

The present disclosure relates generally to wireless communication, and more specifically to emergency service network access by reduced capability radio frequency devices.

In cellular communication, user equipment (e.g., a cell phone) may communicate (e.g., with a base station) under guidelines or rules that may be set and enforced by regulatory and/or standards bodies, such as the Federal Communications Commission (FCC), the Third Generation Partnership Project (3GPP), European Telecommunications Standards Institute (ETSI), and so on. These guidelines may restrict access of reduced capability user equipment to certain portions of a wireless network. The reduced capability user equipment (e.g., as defined by the 3GPP) may include user equipment that has a reduced number of receive chains (e.g., cascades of electronic components and sub-units used to receive wireless signals which may include amplifiers, filters, mixers, attenuators, and so on) than a full capability or "baseline" radio frequency devices). However, these guidelines or rules may lead to the network rejecting emergency-related network access requests (e.g., 911 calls, police calls) based on the number of antennas or receive chains and without first learning whether the network access request was an emergency-related network request.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method of operating a base station may include the base station receiving a random access preamble from user equipment corresponding to a connection request. The random access preamble may include a first indication of a number of receive branches associated with the user equipment. The base station may include a second indication from the user equipment that indicates that the connection request is associated with an emergency. The base station may determine to fulfill the connection request based on the first indication and the second indication and may transmit a contention resolution response in response to determining to fulfill the connection request.

In another embodiment, reduced capability user equipment may include one or more antennas coupled to a transmit branch and only one receive branch. The user equipment may include processing circuitry that transmits, using the transmit branch, a random access preamble to a base station, where the random access preamble includes a first indication of the only one receive branch and a second indication of a request for emergency-service access. The processing circuitry may also receive, using the only one receive branch, a contention resolution response from the base station to establish a connection with the base station in response to the base station accepting the request for emergency-service access.

In yet another embodiment, a base station may include a transceiver and processing circuitry that may receive, via the transceiver, a connection request from an electronic device to establish communication over a desired frequency range used by the transceiver. The processing circuitry may determine that the desired frequency range indicated in the connection request is outside of a preferred frequency range. In response to determining that the desired frequency range is outside of the preferred frequency range, the processing circuitry may determine that the connection request corresponds to an urgent service fulfillment, and in response to determining that the connection request corresponds to the urgent service fulfillment, the processing circuitry may establish communication with the electronic device over the desired frequency range.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
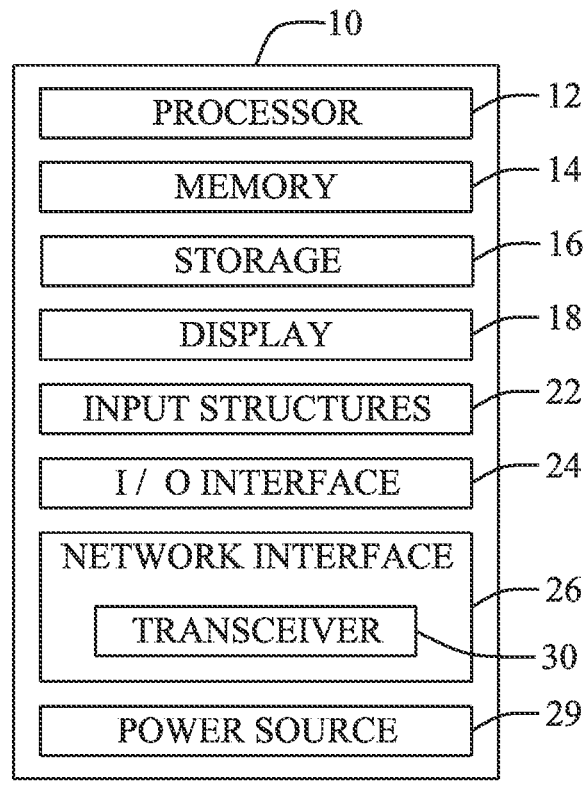
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

In wireless (e.g., cellular) communication, user equipment (e.g., a cell phone, a smartphone, a tablet, a wearable device, a laptop, and so on) may communicate on a channel of a frequency band (e.g., a frequency range 1 (FR1) band (0.41 gigahertz (GHz) to 7.125 GHz) band, a frequency range 2 (FR2) band (24.25 GHz to 52.6 GHz), and so on) with a network (e.g., a wireless communication network) through one or more communication nodes (e.g., base stations). In particular, according to the current Third Generation Partnership Project (3GPP) standard, when establishing communication with the network via base station, the user equipment may detect network coverage (e.g., at a cell supported by the base station) and receive system information including a frequency of a channel from the base station. If the user equipment supports the frequency, the user equipment indicates as such to the base station, and the network may allocate the channel to the user equipment, noting that the user equipment supports a frequency band (e.g., an FR1 band, an FR2 band, and so on) that includes the frequency of the channel. When performing a handover event (e.g., transferring network coverage of the user equipment from the base station to another base station), the base station may indicate (e.g., to the other base station) that the user equipment supports the frequency band based on the user equipment indicating that it supports the frequency of the channel.

The Release 17 (Rel-17) New Radio (NR) work plan of the Third Generation Partnership Project (3GPP) is considering supporting reduced capability (RedCap) devices, which would be a change from previous iterations that mandated user equipment having multiple receiver (RX) chains or branches (e.g., two RX branches, four RX branches). Indeed, a current work item (RP-210918) mandates network support for devices with one receiver (RX) chain (e.g., one antenna and one receiver), which are referred to herein as RedCap devices. In particular, Rel-17 defines the RedCap devices based on a number of RX branches of a full capability or "baseline" device. According to Rel-17, for frequency bands where a baseline NR device is required to be equipped with a minimum of two RX branches (e.g., FR2, certain frequency bands in FR1), a RedCap device is only required to have one RX branch. The specification also supports 2 RX branches for a RedCap UE in these bands. For frequency bands where a baseline NR device is required to be equipped with a minimum of four RX branches (e.g., certain frequency bands in FR1), the minimum number of RX branches supported by specification for a RedCap UE is 1. The specification also supports 2 RX branches for a RedCap UE in these bands. Table 1 below illustrates a comparison of device capabilities between baseline NR devices (as defined by the Release 15 NR work plan of the 3GPP) and RedCap devices as defined by Rel-17.

|  | FR1 | | FR2 | |
| --- | --- | --- | --- | --- |
|  | Baseline device | RedCap device | Baseline device | RedCap device |
| Maximum device bandwidth | 100 MHz | 20 MHz | 200 MHz | 100 MHz |
| Minimum number of device RX branches | 2 or 4, depending on frequency band | 1 or 2 for bands where a baseline NR device is required to have 2; 1 or 2 for bands where a baseline NR device is required to have 4 | 2 | 1 |
| Maximum number of MIMO layers | 2 or 4, depending on frequency band | 1 for RedCap device with 1 RX branch; 2 for RedCap device with 2 RX branches | 2 | 1 |
| Maximum downlink modulation order | 256 QAM | 64 QAM | 64 QAM | 64 QAM |
| Duplex operation | FD-FDD, TDD | UE may implement HD-FDD, FD-FDD, TDD | TDD | TDD |

In particular, a baseline NR device is required to support 100 megahertz (MHz) in FR1, and 200 MHz in FR2, for transmission and reception. For a RedCap device, these requirements are reduced to 20 MHz and 100 MHz, respectively. Additionally, because the number of RX branches may be related to the number of RX antennas, reducing the number of RX branches results in a reduction in the number of RX antennas and cost saving. The requirements on the minimum number of RX branches may depend on frequency bands. Some frequency bands (most of the FR1 frequency-division duplex (FDD) bands, a handful of FR1 time-division duplex (TDD) bands, and all FR2 bands) require a baseline NR device to be equipped with two RX branches, whereas some other frequency bands, mostly in the FR1 TDD bands, require the baseline NR device to be equipped with four receive branches. As previously mentioned, for the bands where a baseline NR device is required to be equipped with a minimum of two RX branches, a RedCap device is only required to have one RX branch while two RX branches is also supported. For the bands where a baseline NR device is required to be equipped with a minimum of four RX branches, a RedCap device is required to have one or two RX branches.

Moreover, the maximum number of downlink multiple-input and multiple-output (MIMO) layers for a RedCap device is the same as the number of RX branches it supports. This is a reduction compared to the requirements for a baseline device. A baseline NR device is also required to support 256 quadrature amplitude modulation (QAM) in the downlink in FR1. For a RedCap device, the support of downlink 256 QAM is optional. For FR1 uplink and FR2, both downlink and uplink, a RedCap device is required to support 64 QAM, same as the requirement for a baseline device.

Regarding duplex operations, a baseline NR device is required to support a full duplex (FD) operation in an FDD band (e.g., transmitting and receiving on different frequencies at the same time). A full-duplex device may incorporate a duplex filter to isolate the interference between the device's transmit and receive paths. In practice, the same device may need to support multiple FDD bands; therefore, multiple duplex filters may be needed to support the FD-FDD operation.

For a RedCap device, the support of FD-FDD is optional (e.g., it is not required to receive in the downlink frequency while transmitting in the uplink frequency, and vice versa). Instead, the RedCap device may support half duplex FDD (HD-FDD) operation, which obviates the need for duplex filters. Instead, a switch can be used to select the transmitter or receive to connect to the antenna. As a switch is less expensive than multiple duplexers, cost savings are achieved. Furthermore, a RedCap device is expected to operate in a single band at a time and will not support carrier aggregation and dual connectivity. Thus, supporting RedCap devices through Rel-17 enables devices that have reduced material cost and complexity when compared to a baseline NR device to access network resources.

A base station may deny user equipment access (e.g., RRC connection rejection, cell barring) to its network based on its number of RX branches, an amount of ongoing cell loading, signal quality considerations, or other network conditions occurring or anticipated to occur in response to accepting the user equipment on the network. For example, a base station may deny user equipment access to the network when the user equipment has a different number of RX branches than what is preferred.

This denial may occur when the base station receives an indication of the number of RX branches and before the user equipment transmits an indication that it is requesting emergency-service access, such as making a 911-related emergency call, a call to a police station, a panic-button-initiated communication, or the like. Indeed, if the user equipment (UE) transmits the early indication of the number of RX branches in a random access request (MSG1), the base station may ignore the random access request from the user equipment and not transmit a random access response (MSG2), thereby causing the UE to time out and to attempt to access another base station. Furthermore, if the user equipment transmits the early indication of the number of RX branches in the random access request (MSG1) or in a request to set up a radio resource control connection (e.g., an RRCSetupRequest (MSG3)), the base station may decide to reject the RRC connection request by sending an RRCReject message in its contention resolution response (MSG4). Moreover, if the user equipment does not transmit the early indication of the number of RX branches but transmits a UE capability with the number of supported RX branches in a subsequent UECapabilityInformation RRC message, the base station may decide to release or suspend the RRC connection with the RRCRelease message, thereby causing the user equipment to enter an IDLE state and to initiate cell selection procedures, or the base station may decide to initiate a handover procedure for the user equipment with the RRCReconfiguration message. In each of the three above-examples, the base station may reject requests for emergency services that otherwise are mandated by Federal Communications Commission (FCC) guidelines for completion by the network provider when denying the request of the user equipment before receiving an indication of whether the request is for emergency-service access.

Under FCC governance, FCC guidelines dictate how a base station is to handle a request from user equipment for emergency-service access. For example, the base station may be required to grant access to the user equipment requesting emergency-service access under FCC 47 C.F.R. Part 9, with clause 9.10 specifying requirements for commercial mobile radio services. RRC specifications further define emergency service handling operations. For example, the 38.331 technical specification (TS38.331) of 3GPP defines information elements related to when a user equipment identifies a request as being for emergency services and the 38.00 technical specification (TS38.00) defines network behavior as related to requests for emergency services. In particular, TS38.00 defines that a base station is to classify an access attempt associated with an emergency request with relatively higher priority and to reject these access attempts on in relatively extreme network load condition that may threaten base station stability itself.

Embodiments of the present disclosure are directed toward complying with FCC guidelines for emergency-service access requests and with 3GPP standard changes to support RedCap devices and cell barring. To comply with both, the base station may deny access to the user equipment based on a preferred number of RX branches after confirming that the request from the user equipment is not for emergency-service access.

For example, the base station may receive a first indication of whether emergency-service access is requested with a second indication of the number of RX branches from the user equipment. To do so, the first indication may indicate whether the RRC connection was established with a connection cause that may include an emergency-service access request or has a relatively elevated priority or urgency for fulfilment, such as an emergency connection cause (e.g., for emergency call subscribers), an mps-PriorityAccess connection cause (e.g., for Multimedia Priority Services subscribers), or an mcs-PriorityAccess connection cause (e.g., for Mission Critical Services subscribers). Based on these indications, the base station may grant or deny access to the network to the user equipment.

Using these indications may be beneficial in many use cases. For example, a jogger carrying a RedCap "smart" watch (e.g., internet or cellular network-enabled watch) may use the watch for 5G NR network connectivity to stream music, maps, health applications, and so on, may benefit from the smart watch, which may only have one RX branch, not being denied access to a network when placing an emergency request, even if the smart watch is not communicatively coupled to a smart phone. As another example, an emergency responder (e.g., police, firefighter, medic) may request emergency-service access via a RedCap wearable (e.g., smart watch, a cellular-connected headset) in the absence of a cellular phone being nearby or connected.

Different systems and methods may be used to improve how a base station responds to the first indication and the second indication and to reduce a likelihood that the base station prematurely denies an emergency-service access request from a reduced capability (RedCap) device. In one case, a random access preamble (MSG1) message may include the first indication indicating whether the RRC connection was established as an emergency-service access request or has a relatively elevated priority or urgency for fulfillment and the second indication of a number of RX branches, both of which may be appended to other network setup information (e.g., random access preamble information). In some cases, the first indication and the second indication may be included in a RRCSetupRequest (MSG3) message information, or in a UECapabilityInformation message. As a second example, the user equipment may transmit the first indication with the random access preamble (MSG1) and the second indication as part of an RRCSetupRequest (MSG3). In the second example, the base station may have limited responses to the random access preamble (MSG1) while awaiting arrival of the second indication in the RRCSetupRequest (MSG3), as to avoid early termination of an emergency request. As a third example, the user equipment may connect to the base station on a frequency layer that is not permitted for RedCap devices. However, the base station may permit the user equipment to use that frequency layer to make an emergency call and ignore barring in this case.

Furthermore, as a fourth example, as the RedCap device moves from a first coverage area supported by a first base station to a second coverage area supported by a second base station, the first base station may attempt to hand network coverage of the user equipment over to the second base station. If the first base station is capable of and providing emergency services to the RedCap device, then the first base station may confirm that the second base station is also capable of providing emergency services to the RedCap device. In particular, when performing the handover procedure, the first base station may receive a system information block (SIB) from the second base station that may indicate whether the second base station supports emergency services (e.g., an ims-Emergency Support message). The first base station may handover the RedCap device to the second base station only if the second base station supports emergency services, ensuring that the RedCap device may not be disconnected from the network due to having an insufficient number of RX branches and ensuring that the RedCap device's communications receive higher priority due to their emergency nature.

Keeping this in mind, FIG. 1 is a block diagram of an electronic device 10. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), cellular network-enabled watch device, a cellular device, and other similar devices. It should be noted that the processor 12 and other related items in FIG. 1 may be generally referred to herein as "data processing circuitry." Such data processing circuitry may be embodied wholly or in part as software, software, hardware, or any combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
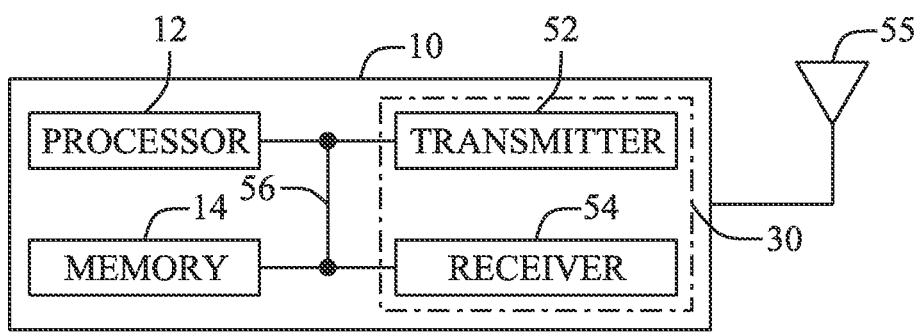
FIG. 2 is a functional block diagram of the electronic device of FIG. 1, according to an embodiment of the present disclosure.

FIG. 2 is a functional block diagram of the electronic device 10 that may implement the components shown in FIG. 1 and/or the circuitry and/or components described in the following figures as a reduced capability (RedCap) device, according to embodiments of the present disclosure. As illustrated, the processor 12, the memory 14, the transceiver 30, a transmitter 52, a receiver 54, and/or an antenna 55 may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and a remote location via, for example, a network or direction connection associated with the electronic device 10 and an external transceiver (e.g., in the form of a cell, eNB (E-UTRAN Node B or Evolved Node B), base stations, and the like. As illustrated, the transmitter 52 and the receiver 54 may be combined into the transceiver 30. The electronic device 10 may also have the antenna 55 electrically coupled to the transceiver 30. The antenna 55 may be configured in an omnidirectional or directional configuration, in a single-beam, dual-beam, or multi-beam arrangement, and so on. The antenna 55 may be associated with a beam and various configurations. In some embodiments, the beam corresponds the transceiver 30. In non-reduced capability devices (e.g., non-RedCap or baseline devices), the electronic device 10 may include multiple transmitters, multiple receivers, multiple transceivers, and/or multiple antennas as suitable for various communication standards.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or devices.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

As explained above, the RedCap device may include a reduced number (e.g., one, two) of receiver (RX) chains or branches, including one antenna 55 and one receiver 54. The RedCap device may be defined based on the 3GPP standard, in which Rel-17 defines a RedCap device based on a number of RX branches of a full capability or "baseline" device. According to Rel-17, for frequency bands where a baseline NR device is required to be equipped with a minimum of two RX branches (e.g., FR2, certain frequency bands in FR1), a RedCap device is only required to have one or two RX branches. For frequency bands where a baseline NR device is required to be equipped with a minimum of four RX branches (e.g., certain frequency bands in FR1), a RedCap device is required to have one or two RX branches. Table 1 above provides more details of the RedCap device when compared to a baseline NR device, as specified by Rel-17.

Figure 3:
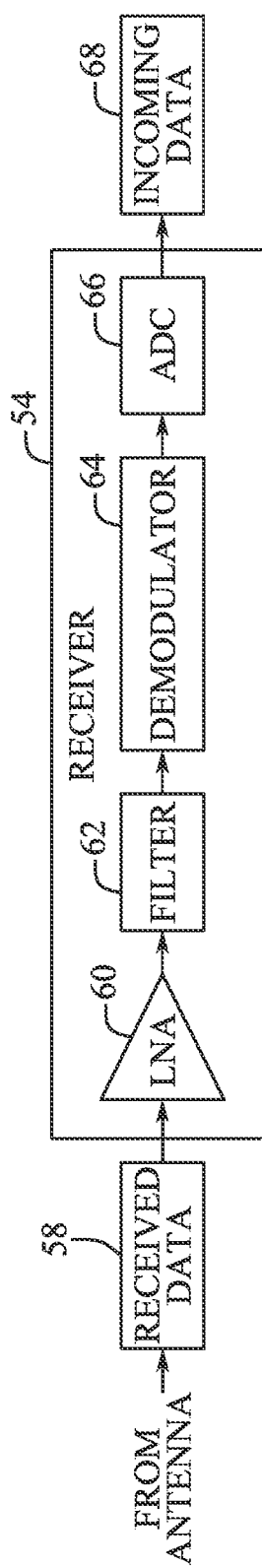
FIG. 3 is a functional block diagram of a receiver of FIG. 2, according to an embodiment of the present disclosure.

As referred to herein, a receive chain or branch may refer to a cascade of electronic components and sub-units used by and/or including the receiver 54 to receive wireless signals, which may include amplifiers, filters, mixers, attenuators, and so on. In particular, FIG. 3 is a schematic diagram of the receiver 54 (e.g., receive circuitry), according to embodiments of the present disclosure. As illustrated, the receiver 54 may receive received data 58 from the antenna 55 in the form of an analog signal. A low noise amplifier (LNA) 60 may amplify the received analog signal to a suitable level for the receiver 54 to process. A filter 62 (e.g., filter circuitry and/or software) may remove undesired noise from the received signal, such as cross-channel interference. The filter 62 may also remove additional signals received by the antenna 55 which are at frequencies other than the desired signal. The filter 62 may include any suitable filter or filters to remove the undesired noise or signals from the received signal, such as a bandpass filter, a bandstop filter, a low pass filter, a high pass filter, and/or a decimation filter. A demodulator 64 may remove a radio frequency envelope and/or extract a demodulated signal from the filtered signal for processing. An analog-to-digital converter (ADC) 66 may receive the demodulated analog signal and convert the signal to a digital signal of incoming data 68 to be further processed by the electronic device 10. Additionally, the receiver 54 may include any suitable additional components not shown, or may not include certain of the illustrated components, such that the receiver 54 may receive the received data 58 via the antenna 55. For example, the receiver 54 may include a mixer and/or a digital down converter. At least some of the components of the receiver 54 may be referred to as a "receive chain" or "receive branch." Similarly, at least some components the transmitter 52 (e.g., a digital-to-analog converter (DAC), a modulator, a power amplifier, a filter, a mixer, a digital up converter, and so on) may be referred to as a "transmit chain" or "transmit branch."

Figure 4:
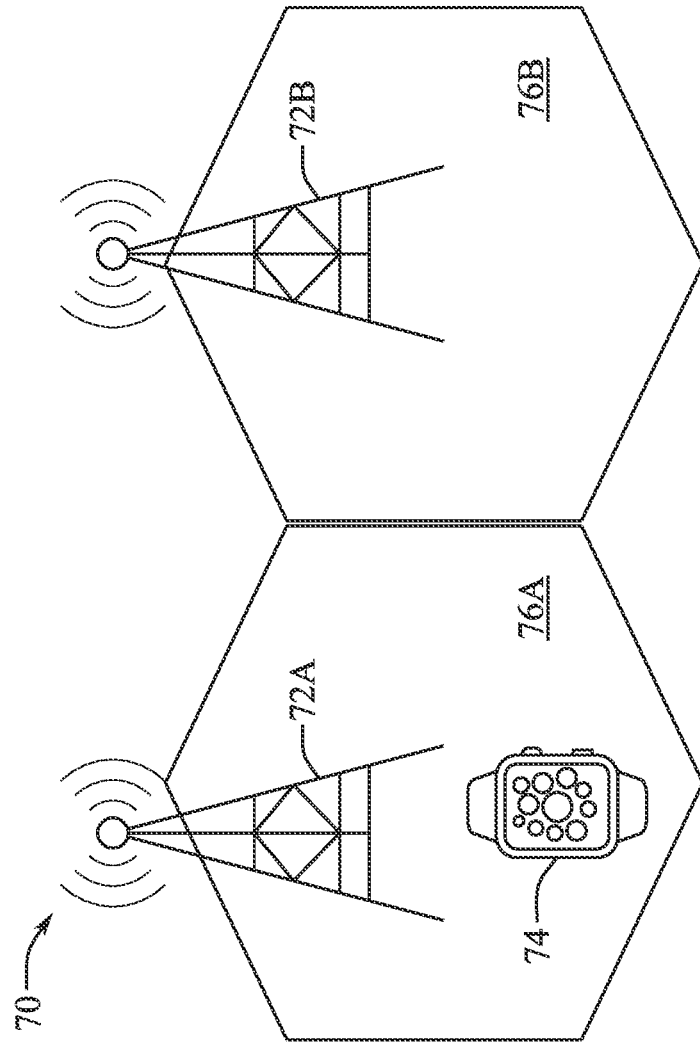
FIG. 4 is a schematic diagram of a wireless communication network supported by a base station and communicatively coupled to the electronic device of FIG. 1, according to an embodiment of the present disclosure.

As previously noted, the 3GPP may expand standards to permit network providers to support RedCap devices. Systems and methods that reduce a likelihood that a network provider may deny an emergency-service access request from a RedCap device without a preferred configuration may be desired, such as to comply with FCC guidelines. With the foregoing in mind, FIG. 4 is an illustration of a wireless communication network 70 supported by base stations 72A, 72B and user equipment (UE) 74 (e.g., such as the electronic device 10), according to embodiments of the present disclosure. The base station 72A may provide coverage of the network 70 (e.g., a cellular network) for devices (e.g., including UE 74) in a geographical area or a cell 76A, and the base station 72B may provide coverage of the network 70 for the devices in a geographical area or a cell 76B.

The base stations 72A, 72B (collectively 72) and/or the user equipment 74 may have one or more components similar to the electronic device 10, and thus may include control circuitry such as the processors 12, the memory 14 and/or the nonvolatile storage 16, which may operate together to cause the base stations 72 and/or the user equipment 74 to perform respective operations. In particular, the processor 12 of the base station 72A and the processor 12 of the base station 72B may perform operations of the network 70. It is noted that the user equipment 74 may include any of various types of computer systems or computing devices which may communicate with the base station 72A or the base station 72B. Examples of the user equipment 74 are any suitable portable electronic devices, mobile telephones, smartphones, portable gaming devices, laptops, wearable devices, or the like. As referred to herein, the user equipment 74 may include the RedCap device as described above.

To establish connection to the network 70, the user equipment 74, via the transmitter 52 and/or the receiver 54, may establish a Radio Resource Control (RRC) session with the network 70 after being accepted by the network 70. The network 70 and a base station (e.g., 72A) may implement any suitable network technology or standard, such as Long-Term Evolution (LTE) or 4th Generation (4G) cellular network through eNodeB (eNB) base stations, a New Radio (NR) or 5th Generation (5G) cellular networks through next generation NodeB (gNB) base stations, and so on.

The network 70 may generate a schedule, including time periods to perform uplink (UL) and downlink (DL)) operations. In some embodiments, the base station 72A may then instruct the user equipment 74 to configure its transmitter 52 and/or receiver 54 according to the schedule. It should be understood that uplink data or signals refer to transmissions from the transmitter 52 of the user equipment 74 to the base station 72A of the network 70, and downlink data or signals refer to the transmissions from the base station 72A of the network 70 to the receiver 54 of the user equipment 74.

As noted above, the user equipment 74 may be accepted by the network 70. However, the network 70 may alternatively reject the user equipment 74 (e.g., when the user equipment operates according to a configuration incompatible or not preferred by the network 70A). For example, the network 70A may have frequency communication preferences, RX branch preferences, geospatial preferences, or the like, according to which the network 70A accepts, rejects, or handovers the user equipment 74 to another network 70. However, FCC guidelines may limit when the network 70A may reject a request from the user equipment 74, for example, by barring rejections of an emergency-service access request from RedCap devices. Including a first indication of whether emergency-service access is requested with a second indication of the number of RX branches in a message from the user equipment 74 may provide the network 70A a suitable amount of information to accept or reject the user equipment 74 while complying with 3GPP standards and FCC guidelines.

Additionally, user equipment 74 may sometimes be moved or move from a first coverage area (e.g., 76A) supported by a first base station (e.g., 72A) to a second coverage area (e.g., 76B) supported by a second base station (e.g., 72B). As a result, the first base station 72A may attempt to hand network coverage of the user equipment 74 over to the second base station 72B so that the user equipment 74 may have continued, uninterrupted access to the network 70. Such a handover event may occur when the user equipment 74 moves between cells 76 of the respective base stations 72, when overloading on one base station (e.g., 72A) triggers offloading of the user equipment 74 to another base station (e.g., 72B), or the like. If the first base station 72A is capable of and providing emergency services to the user equipment 74, then the first base station 72A may confirm that the second base station 72B is also capable of providing emergency services to the user equipment 74. In particular, when performing the handover procedure, the first base station 72A may receive a system information block (SIB) from the second base station 72B that may indicate whether the second base station 72B supports emergency services (e.g., an ims-EmergencySupport message). The first base station 72A may handover the user equipment 74 to the second base station 72B only if the second base station 72B supports emergency services, ensuring that the user equipment 74 may not be disconnected from the network 70 due to having an insufficient number of RX branches and ensuring that the user equipment's communications receive higher priority due to their emergency nature.

Figure 5A:
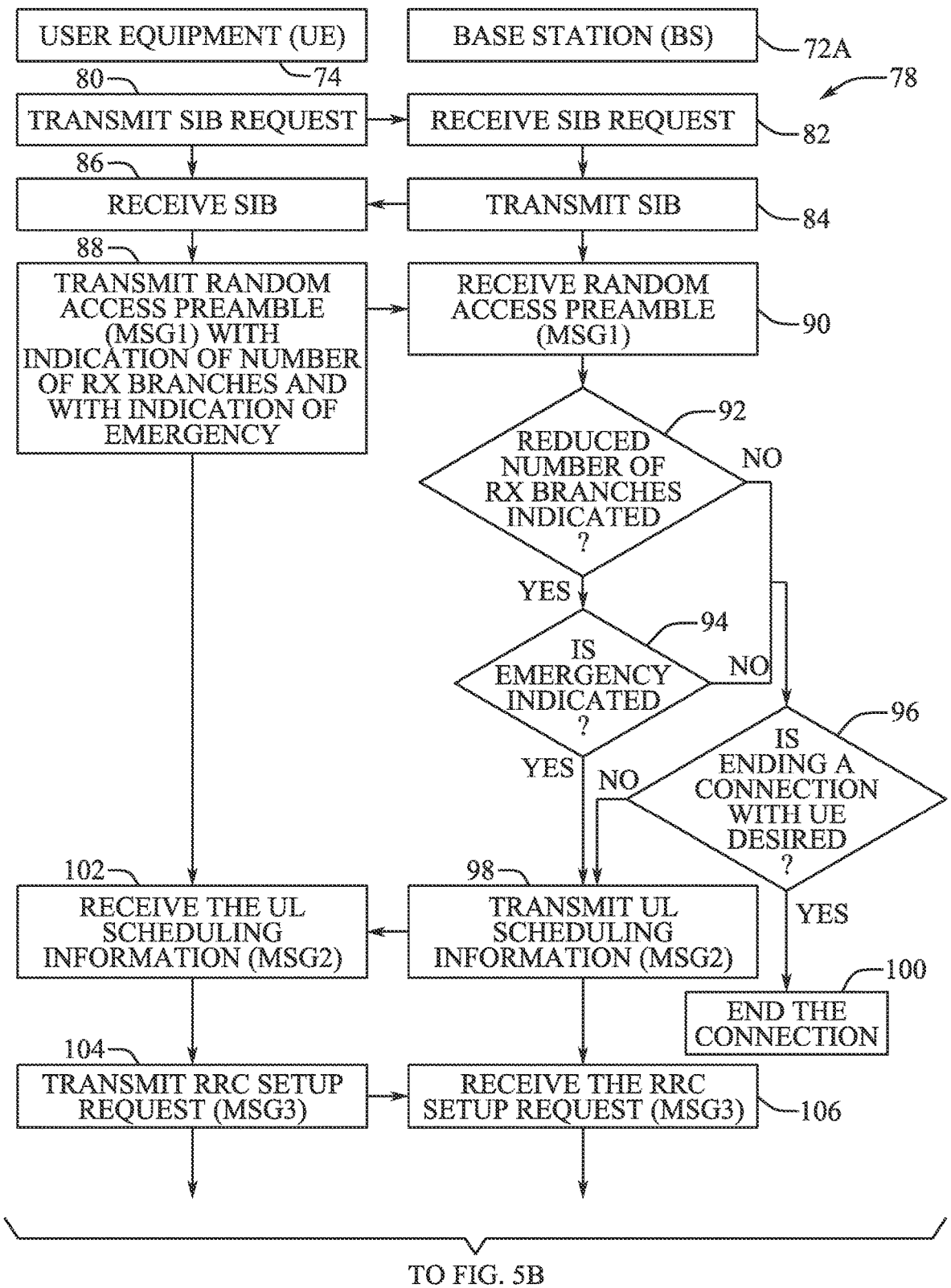
FIGS. 5A and 5B, collectively referred to as FIG. 5 herein, are a flowchart of a method for providing an indication of a number of receive (RX) branches of the electronic device of FIG. 1 and an indication of an emergency in a random access preamble (MSG1) and preventing the base station of FIG. 4 from disconnecting the electronic device when connecting for emergency purposes, according to an embodiment of the present disclosure.
Figure 5B:
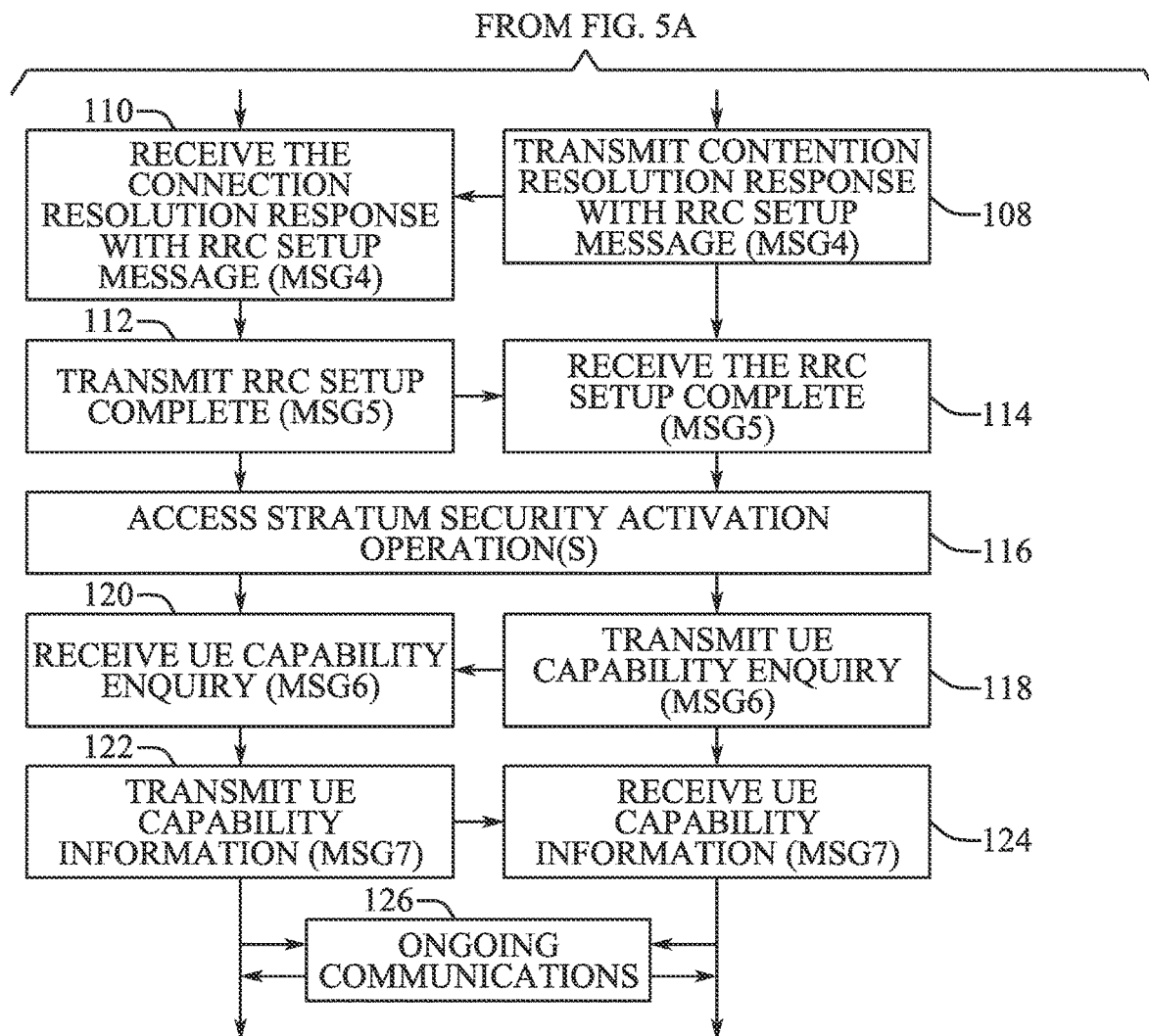

To elaborate on the above-described improved request-handling operations, FIG. 5 is a flowchart of a method 78 for providing an indication of a number of RX branches of the user equipment 74 and an indication of an emergency in a random access preamble and preventing a base station (e.g., 72A) from disconnecting the user equipment 74 when connecting for emergency purposes, according to embodiments of the present disclosure. Any suitable device (e.g., a controller) that may control components of the user equipment 74, the base station 72A, and/or the network 70, such as the processor 12 of each of these devices or systems, may perform the method 78. In some embodiments, the method 78 may be implemented by executing instructions stored in a tangible, non-transitory, computer-readable medium, such as the memory 14 or storage 16, using the processor 12. For example, the method 78 may be performed at least in part by one or more software components, such as an operating system, one or more software applications, and the like, of the user equipment 74, the base station 72A and/or the base station 72B, and/or the network 70. In this way, the method 78 is described relative to user equipment 74 communicating with the base station 72A, however it should be understood that these methods apply to any suitable user equipment or electronic device 10 communicating with any suitable base station 72. While the method 78 is described using steps in a specific sequence, it should be understood that the present disclosure contemplates that the described steps may be performed in different sequences than the sequence illustrated, and certain described steps may be skipped or not performed altogether. It is noted that each transmission or reception operation described herein may involve encoding and/or decoding, such as to more efficiently transmit data wirelessly, and thus descriptions of these operations are generally omitted with reference to FIGS. 5-8.

At block 80, the user equipment 74 transmits a request for a system information block message (SIB) from the base station 72A and, at block 82, the base station 72A receives the SIB request. In particular, the user equipment 74 may detect the base station 72A by receiving a radio frequency (RF) signal when the user equipment 74 enters the coverage area or cell 76A of the base station 72A. The RF signal may include timing alignment information, among other information. Before requesting the SIB, the user equipment 74 may synchronize to the base station 72A by aligning its timing with the timing alignment information of the base station 72A. The transmission of the request for the SIB may be done so in response to user input interacting with a control feature of the user equipment 74, such as a graphical or physical button (e.g., panic button, call button) on the display 18 and/or touchscreen that, when pressed, causes the user equipment 74 to place an emergency call, and thus trigger the operations of FIGS. 5 and 6. Thus, the user equipment 74 may present an image of a button that may trigger a processor 12 to generate the random access preamble in response to user input.

At block 84, the base station 72A transmits the SIB to the user equipment 74 and, at block 86, the user equipment 74 receives the SIB. The SIB may include system information indicative of frequency subranges supported by the base station 72A. The SIB may also indicate whether the base station 72A is capable of processing or handling emergency-service access requests, such as whether the base station 72A bars certain frequency ranges or types of communication requests, whether the base station 72A has privileges or access to emergency-service frequencies or whether the base station 72A is capable of processing emergency-service access requests with urgency relative to normal, non-emergency access requests. The system information conveyed in the SIB may additionally include timing specification, power specifications, Global Positioning System (GPS) coordinates, and/or any other applicable information. In some embodiments, the user equipment 74 may store the system information in the memory 14 for future usage.

At block 88, the user equipment 74 may transmit a random access preamble (MSG1) with an indication of a number of RX branches and with an indication of an emergency, such as an indication of an emergency establishment cause, mps-PriorityAccess establishment cause, and/or mcs-PriorityAccess establishment cause (e.g., as defined in the 38.331 technical specification (TS38.331) of 3GPP). The indication of emergency may indicate to the base station 72A that the request is for urgent or prioritized service fulfillment, and thus may itself be considered an indication of urgent service fulfillment or an indication of a status corresponding to urgent service fulfillment operations. The base station 72A, after determining to communicate with the user equipment 74, may advance communications related to the indication of emergency in fulfillment queues, use dedicated frequency ranges, increase channel throughput or bandwidth, reduce traffic on a channel with the user equipment 74, or the like, to prioritize transmission of the emergency-related or high urgency request relative to normal requests, less urgent requests, or non-emergency requests. It is noted that the random access preamble (MSG1), UL scheduling information (MSG2) message, RRCSetupRequest (MSG3) message, and RRCSetup (MSG4) message may correspond to messages transmitted during a contention-based random access procedure; RRCSetupRequest (MSG3), RRCSetup message (MSG4), and RRCSetupComplete (MSG5) message may correspond to messages used as a RRC connection establishment procedure; and UECapabilityInformation (MSG7) may correspond to a UE capability transfer procedure, as may be appreciated.

At block 90, the base station 72A may receive the random access preamble (MSG1) from the user equipment 74. The indication of an emergency may include a flag, appended data, a signal, or the like included in a message (random access preamble (MSG1) in this case) to indicate that a connection request has an emergency or relatively high urgency establishment cause. Different message types or signals may be used to indicate the emergency-nature or urgency of the request. In the random access preamble (MSG1), the user equipment 74 may transmit a request for specific resources from the base station 72A for communicating on the network 70, the first indication, and the second indication to the base station 72A. Thus, the random access preamble (MSG1) includes the request of a random access preamble, as well as the first indication of whether emergency-service access is requested, and the second indication of the number of RX branches in a message, wherein the number of RX branches may equal a number of antennas in the user equipment 74 (e.g., the RedCap electronic device 10). The random access preamble (MSG1) may be considered an early warning or an early indication of desired configurations requested by the user equipment 74. The base station 72A may receive the early notice since the first indication indicates whether a scheduled communication from the user equipment 74 is an emergency-service access request before communication is fully established with the network 70A.

After receiving the random access preamble (MSG1), the base station 72A determines compatibility between the request, network 70 preferences, and/or network 70 conditions. To elaborate, at block 92, the base station 72A determines whether the indications transmitted with the random access preamble (MSG1) indicate that the user equipment 74 has a reduced number of RX branches (e.g., 1 RX branch of a RedCap NR device reduced relative to 2 RX branches or 4 RX branches of a baseline NR device). The base station 72A may compare a number of RX branches indicated by the user equipment 74 to a threshold number of RX branches (e.g., a non-reduced number of RX branches corresponding to a baseline NR device). When the base station 72A determines that the user equipment 74 has a reduced number of RX branches (e.g., a number of RX branches less than or equal to the threshold number of RX branches), the base station 72A may delay denying any access to the user equipment 74 and continue onto block 94. When the base station 72A determines that the user equipment 74 does not have a reduced number of RX branches, the base station 72A may continue on to perform default operations, such as determining, at block 96, whether ending a connection with the user equipment 74 is desired. This may include the base station 72A determining whether the user equipment 74 requested via the random access preamble (MSG1) communication that meets communication preferences of the base station 72A. When the base station 72A determines to maintain the connection with the user equipment 74, the base station 72A, at block 98, may continue to perform operations to continue establishing the connection with the user equipment 74. However, when the base station 72A determines to end the connection, the base station 72A, at block 100, may end the connection. For example, the base station 72A may deny or hand over the user equipment 74 to another base station 72 or frequency layer compliant with the random access preamble (MSG1). The base station 72A may reject the user equipment 74 by transmitting a RRCReject message.

As noted above, after the base station 72A determines that the user equipment 74 indicated a reduced number of RX branches, the base station 72A proceeds to determine, at block 94, whether the random access preamble (MSG1) indicated the establishment cause of the connection request as being for an emergency or relatively high urgency. The random access preamble (MSG1) may include the indication of emergency. When an emergency is not indicated, the base station 72A proceeds to determine, at block 96, whether ending a connection with the user equipment 74 is desired. However, when an emergency is indicated, the base station 72A may be barred from denying the request of the user equipment 74 and is to fulfill the request. Hence, the base station 72A may proceed to block 98 to prepare the connection with the user equipment 74 for communications via the network 70A.

At block 98, the base station 72A responds to the random access preamble message sent by the user equipment 74 with the UL scheduling information (MSG2) and, at block 102, the user equipment receives the UL scheduling information (MSG2). By doing so, the base station 72A determines to accept the request from the user equipment 74 and may configure its resources to settings provided by the user equipment 74 in the random access preamble message. For example, the base station 72A may configure one or more resources to the frequency subranges supported by the user equipment 74 and the base station 72A. Once the resources are configured and a connection is established between the user equipment 74 and the base station 72A, the base station 72A responds with the UL scheduling information (MSG2). The UL scheduling information (MSG2) may include a random access response message and durations of time or communication intervals for the user equipment 74 to abide by when transmitting data to the base station 72A and the network 70. If the user equipment 74 has downlink (DL) capabilities, a same or separate message from the base station 72A may include DL scheduling information to define durations of time or communication intervals for the user equipment 74 to abide by when receiving data from the base station 72A and the network 70.

At block 104, the user equipment 74 reads the UL scheduling information (MSG2) and transmits a RRCSetupRequest (MSG3) to the base station 72A and, at block 106, the base station 72A receives the RRCSetupRequest (MSG3). The RRCSetupRequest (MSG3) may confirm receipt of the UL scheduling information (MSG2) to the base station 72A. The RRCSetupRequest (MSG3) may also include indications of any timing adjustments made by the user equipment 74 to proposed communication intervals from the UL scheduling information (MSG2).

At block 108, the base station 72A transmits a contention resolution message with a RRCSetup message (MSG4) after receiving the RRCSetupRequest (MSG3) from the user equipment 74, which receives the RRCSetup message (MSG4) at block 110. The contention resolution message may indicate to the user equipment 74 that the base station 72A accepts the timing adjustments requested in the RRC-SetupRequest (MSG3).

At block 112, the user equipment 74 may transmit a RRCSetupComplete (MSG5) message after preparing the transceiver 30 for communication according to the communication intervals indicated in the RRCSetupRequest (MSG3) and/or the UL scheduling information (MSG2). At block 114, the base station 72A may receive the RRCSetupComplete (MSG5). The RRCSetupComplete (MSG5) message indicates to the base station 72A that the user equipment 74 is prepared for communication on the network 70A. In response to exchanging the RRCSetupComplete (MSG5) message, at block 116, the base station 72A may initiate and perform one or more access stratum security activation operation(s). These operations may be used by a network provided or spectrum access entity to authenticate, via the base station 72A, communications between the user equipment 74, the base station 72A, and/or the network 70. The access stratum security activation operations may involve the base station 72A confirming with the network 70, such as a spectrum access entity, that communication with the user equipment 74 is permitted by, for example, confirming user accounts, hardware identifiers (IDs), subscriber identification module (SIM) cards, or the like.

In confirmation of the RRCSetupComplete message (MSG5) and activation operations of block 116 completing, at block 118, the base station 72A may transmit a UECapabilityEnquiry (MSG6) message to the user equipment 74, which is received at block 120. The UECapabilityEnquiry (MSG6) message requests additional configuration information from the user equipment 74 and confirms that the base station 72A is permitted to communicate with the user equipment 74. In response to the UECapabilityEnquiry (MSG6) message, at block 122, the user equipment 74 transmits a message including UECapabilityInformation (MSG7) to provide the base station 72A with the requested additional configuration information, which is received at block 124. After the base station 72A receives the message including UECapabilityInformation (MSG7), the base station 72A proceeds to fulfill the request of the user equipment 74 and, at block 126, communicate with the user equipment 74. In this manner, the method 78 may enable the user equipment 74 to provide an indication of a number of its RX branches of the user equipment 74 and an indication of an emergency in a random access preamble and prevent the base station 72A from disconnecting from the user equipment 74 when connecting for emergency purposes, even when the user equipment 74 is a RedCap device having a reduced number (e.g., only one) of RX branches.

Figure 6A:
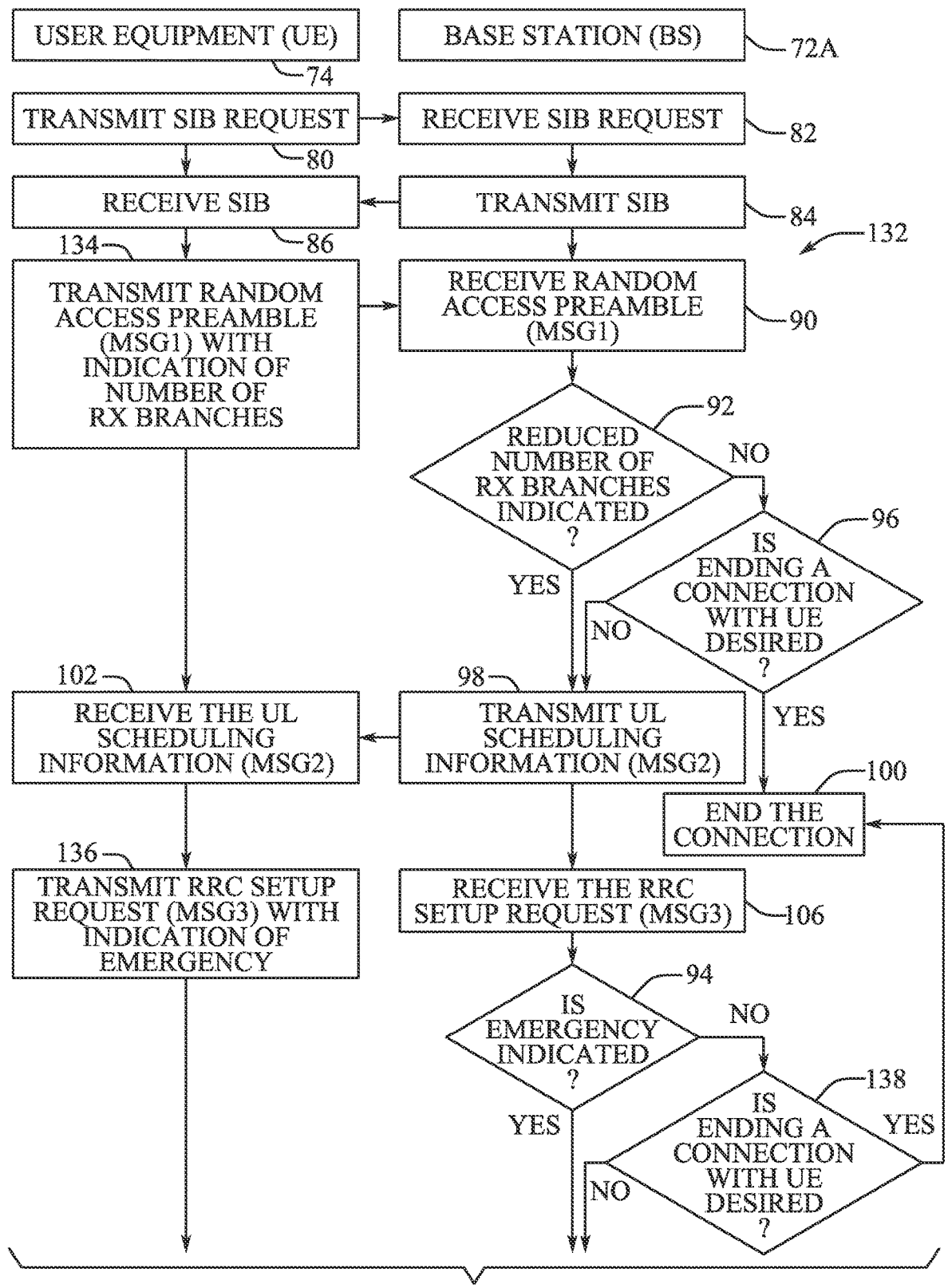
FIGS. 6A and 6B, collectively referred to as FIG. 6 herein, are a flowchart of a method for providing an indication of a number of receive (RX) branches of the electronic device of FIG. 1 in a random access preamble (MSG1) and an indication of an emergency in an RRCSetupRequest (MSG3), and preventing the base station of FIG. 4 from disconnecting the electronic device when connecting for emergency purposes, according to an embodiment of the present disclosure.
Figure 6B:
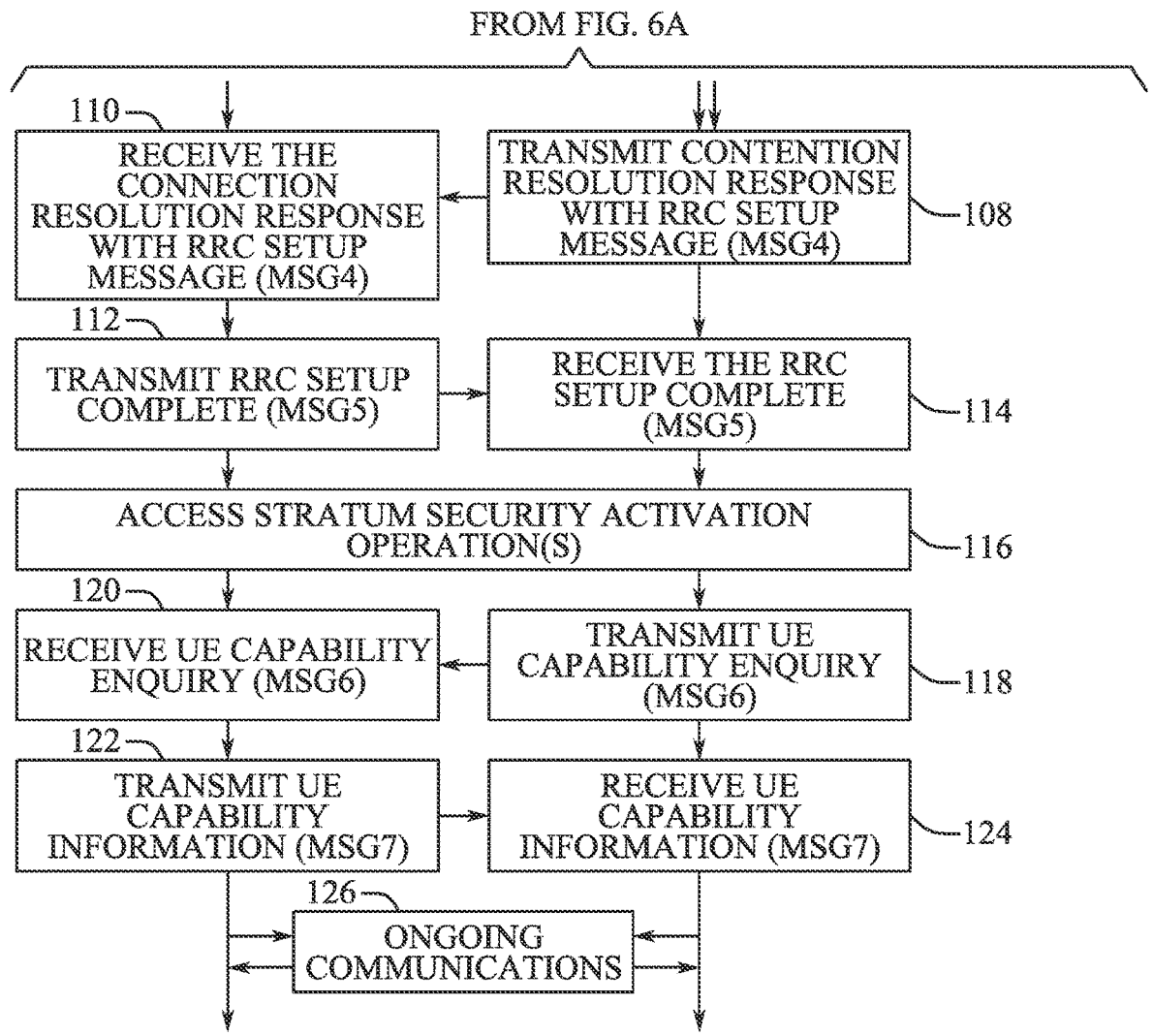

With the foregoing in mind, FIG. 6 is a flowchart of a method 132, which modifies method 78 of FIG. 5 to include the first indication and the second indication in different messages during the setup operations, according to embodiments of the present disclosure. Indeed, FIG. 6 is a flowchart of a method 132 for providing an indication of a number of RX branches of the user equipment 74 in the random access preamble (MSG1) and an indication of an emergency in the RRCSetupRequest (MSG3), and preventing a base station (e.g., 72A) of FIG. 4 from disconnecting the user equipment 74 when connecting for emergency purposes, according to embodiments of the present disclosure. Any suitable device (e.g., a controller) that may control components of the user equipment 74, the base station 72A, and/or the network 70, such as the processor 12 of each of these devices or systems, may perform the method 132. In some embodiments, the method 132 may be implemented by executing instructions stored in a tangible, non-transitory, computer-readable medium, such as the memory 14 or storage 16, using the processor 12. For example, the method 132 may be performed at least in part by one or more software components, such as an operating system, one or more software applications, and the like, of the user equipment 74, the base station 72A, and/or the network 70. In this way, the method 132 is described relative to user equipment 74 communicating with the base station 72A, however it should be understood that these methods apply to any suitable user equipment or electronic device 10 communicating with any suitable base station 72. While the method 132 is described using steps in a specific sequence, it should be understood that the present disclosure contemplates that the described steps may be performed in different sequences than the sequence illustrated, and certain described steps may be skipped or not performed altogether. Furthermore, certain operations of method 78 are similarly performed for method 132, and thus those descriptions apply here.

Blocks 80-84 are performed as described in method 78 of FIG. 5. At block 134, in response to receiving the SIB, the user equipment 74 may transmit a random access preamble (MSG1) that includes similar information as the random access preamble (MSG1) of block 84 of method 78, but without including the first indication of whether emergency-service access is requested. At block 90, the base station 72A may receive the random access preamble (MSG1) and, at block 92, the base station 72A may determine whether a reduced number of RX branches is indicated in the random access preamble (MSG1), similar to operations of method 78. If, at block 96, ending a connection with the user equipment 74 is desired, the base station 72A may, at block 100, end the connection. However, if, at block 96, ending a connection with the user equipment 74 is not desired and the user equipment 74 has a full or non-reduced number of RX branches (e.g., the user equipment 74 is a non-RedCap or baseline device), or if the user equipment 74 has a reduced number of RX branches (e.g., the user equipment 74 is a RedCap device) and thus a connection should not be prematurely denied prior to learning the emergency status, the base station 72A may proceed to block 98. At block 98, the base station 72A may transmit UL scheduling information (MSG2) similar to method 78 of FIG. 5. In response to receiving the UL scheduling information (MSG2) at block 102, the user equipment may transmit, at block 136, the RRCSetupRequest (MSG3) message with an indication of the request being an emergency-service access request to the base station 72A, which receives it at block 106. In response to the RRCSetupRequest (MSG3), at block 94, the base station 72A may determine whether the user equipment 74 indicated an emergency (e.g., indicated the request to be associated with a request for emergency-service access). In method 78, the base station 72A referenced the random access preamble (MSG1) for the indication of emergency. However, in method 132, the base station 72A references the RRCSetupRequest (MSG3) for the indication of emergency. Indeed, this method 132 shows an example of a case where it may be desired or required to transmit the indication of emergency separate from the indication of the number of RX branches.

When an emergency is indicated, at block 108, the base station 92A may fulfill the request of the user equipment 74 and proceed with transmitting the contention resolution response with RRC Setup Message (MSG4) described earlier with method 78. However, when an emergency is not indicated, the base station 72A has the option to deny the user equipment 74 access to the network 70A and/or to handover the user equipment 74 to another network 70. Thus, the base station 72A repeats operations of block 96 at block 138 to determine whether to end a connection with the user equipment 74. When desired, at block 100, the base station 72A may end the connection with the user equipment 74 by either handing over the user equipment 74 or letting the request of the user equipment 74 timeout without a reply. When it is not desired to end the connection, the method 132 proceeds to block 108, where the base station 72A may continue the operations to maintain connection with the user equipment 74. Descriptions of blocks 108-126 from FIG. 5 of method 78 apply here and thus are skipped. In this manner, the method 132 may enable the user equipment 74 to provide an indication of a number of RX branches of the user equipment 74 in the random access preamble (MSG1) and an indication of an emergency in the RRCSetupRequest (MSG3), and prevent the base station 72A from disconnecting the user equipment 74 prematurely when connecting for emergency purposes.

Figure 7:
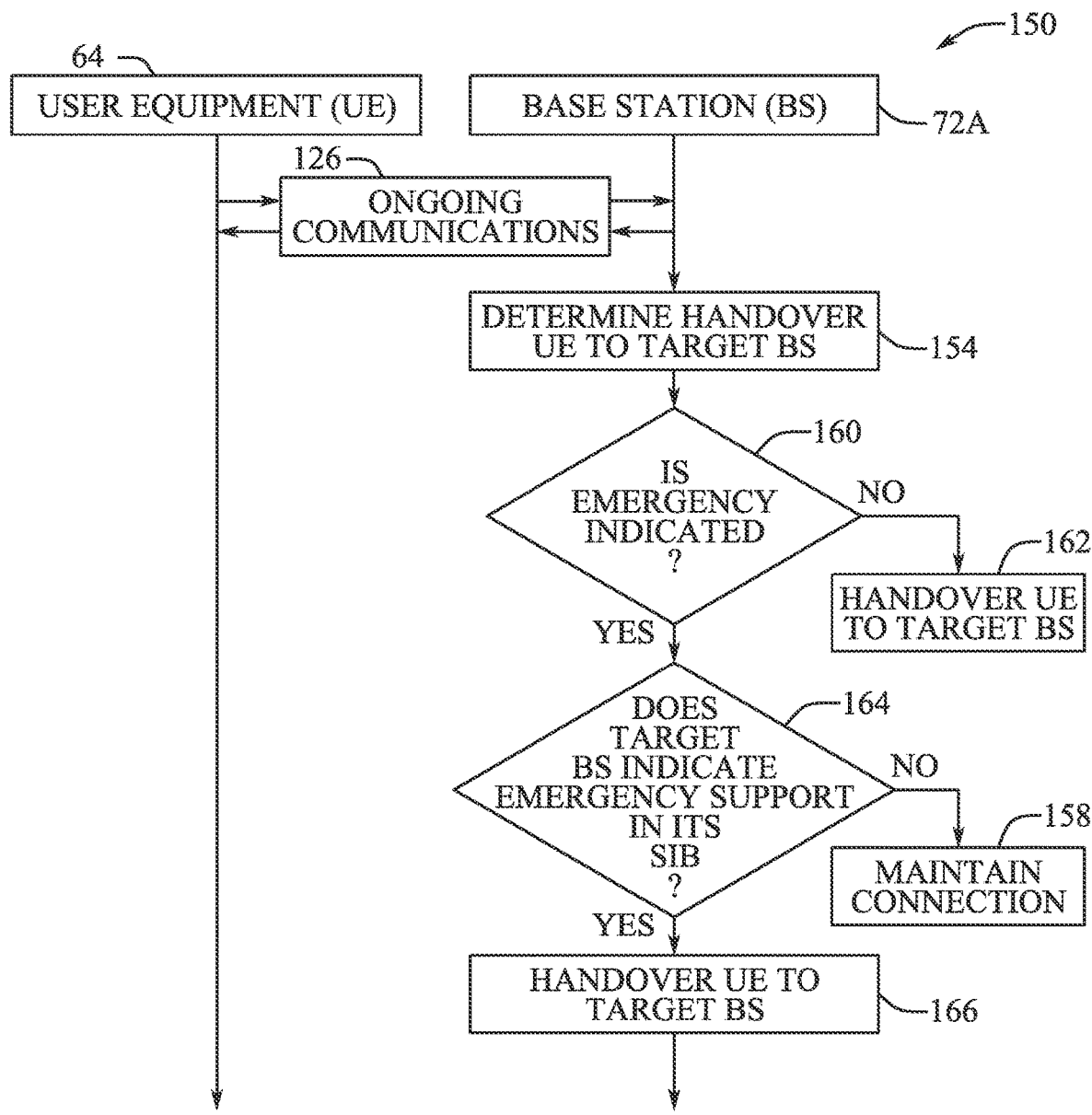
FIG. 7 is a flowchart of a method for ensuring that the base station of FIG. 4 from hands over the electronic device of FIG. 4 to another base station that supports communications for emergency purposes, according to an embodiment of the present disclosure.

During active communications, the base station 72A may determine to handover the user equipment 74 to another base station (e.g., 72B). To elaborate, FIG. 7 is a flowchart of a method 150 for ensuring that user equipment (e.g., 74) connecting for emergency purposes is handed over to a base station (e.g., 72B) that can support the emergency, according to embodiments of the present disclosure. Any suitable device (e.g., a controller) that may control components of the user equipment 74, the base station 72A, and the terrestrial network, such as the processor 12 of each of these devices or systems, may perform the method 150. In some embodiments, the method 150 may be implemented by executing instructions stored in a tangible, non-transitory, computer-readable medium, such as the memory 14 or storage 16, using the processor 12. For example, the method 150 may be performed at least in part by one or more software components, such as an operating system, one or more software applications, and the like, of the user equipment 74, the base station 72A and/or the base station 72B, and the terrestrial network. In this way, the method 150 is described relative to user equipment 74 communicating with the base station 72A, however it should be understood that these methods apply to any suitable user equipment or electronic device 10 communicating with any suitable base station 72. While the method 150 is described using steps in a specific sequence, it should be understood that the present disclosure contemplates that the described steps may be performed in different sequences than the sequence illustrated, and certain described steps may be skipped or not performed altogether.

At block 126, the user equipment 74 and the base station 72A may actively communicate (e.g., as described in FIG. 5 and/or FIG. 6). During the active communications, the base station 72A may, at block 154, receive an indication or determine to handover the user equipment 74. For example, it may be desired to perform the handover when the user equipment 74 is moved outside a coverage area (76A), or when network conditions, such as load or current demand, change.

The base station 72A, at block 160, may determine whether user equipment 74 indicated an emergency, or whether the user equipment 74 is communicating to receive emergency support. When not indicated, the base station 72A, at block 162, may handover the connection to the target base station (e.g., 72B). However, when an emergency is indicated, the base station 72A may not handover the user equipment 74 before confirming that the target base station (e.g., 72B) supports emergency services. Thus, the base station 72A, at block 164, may determine whether a target base station 72B indicates that it is able to support emergency-related or high urgency requests in its SIB. To determine this, the base station 72A may request and receive the SIB from the target base station 72B and determine whether data, a flag, an indication, or the like is included in the SIB to communicate its ability to handle emergency, high urgency, or high priority requests. This indication may be an ims-EmergencySupport data field.

When the target base station 72B does not handle emergency requests, the base station 72A, at block 158, may maintain the connection with the user equipment 74. However, when the target base station 72B does handle emergency requests, the base station 72A, at block 166, may handover the user equipment 74 to the target base station 72B. The base station 72A may transmit an indication of the emergency request to the target base station 72B when handing over the user equipment 74 such that the indication of emergency is not lost in the handover. After the handover, the target base station 72B fulfils the connection request of the user equipment 74 as though it was a new random access preamble (MSG1). Once fulfilled, the user equipment 74 may receive a confirmation message from the base station 72B. The confirmation message may trigger the user equipment 74 to communicate on the network 70B of the base station 72B and/or to perform some of the operations of FIGS. 5 and 6 to verify the connection with the base station 72B. Thus, the method 150 may ensure that the user equipment 74 connecting for emergency purposes is handed over to a base station (e.g., 72B) that can support the emergency.

Figure 8:
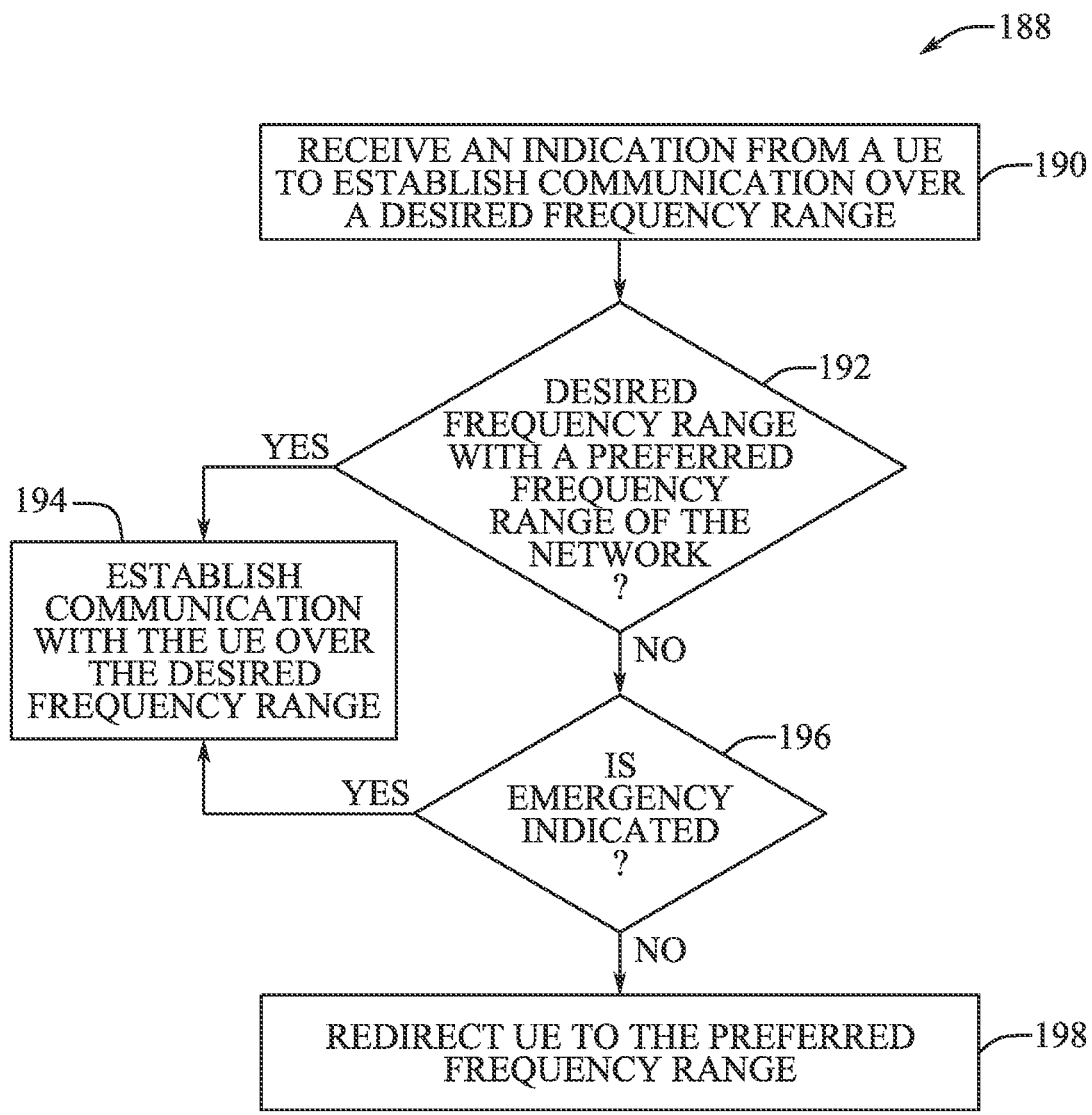
FIG. 8 is a flowchart of a method for enabling the electronic device of FIG. 4 to operate on a non-preferred or barred frequency layer for emergency purposes, even if it is a reduced capability device, according to an embodiment of the present disclosure.

In some cases, a network provider may desire to bar RedCap devices from a certain frequency layer. The network provider may indicate such barring in the SIB for one or more corresponding base stations 72. However, FIG. 8 provides a method for overriding this preference when a RedCap device places an emergency call or request, which may prevent the base station 72A from rejecting the request to connect for emergency purposes. Indeed, FIG. 8 is a flowchart of a method 188 for enabling the user equipment 74 to operate on a non-preferred or barred frequency layer for emergency purposes, even if it is a RedCap device, according to embodiments of the present disclosure. Any suitable device (e.g., a controller) that may control components of the user equipment 74, the base station 72A, and the network 70, such as the processor 12 of each of these devices or systems, may perform the method 188. In some embodiments, the method 188 may be implemented by executing instructions stored in a tangible, non-transitory, computer-readable medium, such as the memory 14 or storage 16, using the processor 12. For example, the method 188 may be performed at least in part by one or more software components, such as an operating system, one or more software applications, and the like, of the user equipment 74, the base station 72A and/or the base station 72B, and/or the network 70. In this way, the method 188 is described relative to user equipment 74 communicating with the base station 72A, however it should be understood that these methods apply to any suitable user equipment or electronic device 10 communicating with any suitable base station 72. While the method 188 is described using steps in a specific sequence, it should be understood that the present disclosure contemplates that the described steps may be performed in different sequences than the sequence illustrated, and certain described steps may be skipped or not performed altogether.

At block 190, the base station 72A may receive an indication from the user equipment 74 to establish communication over a desired frequency range. This indication may be part of ongoing communications of the base station 72A and the user equipment 74. The desired frequency range may correspond to a range of frequencies used by the antenna 55 of the user equipment 74 (e.g., a RedCap device) to transmit or receive wireless signals. The desired frequency range for a RedCap device may be defined by the 3GPP standards in RP-210918 as those in the NR FR1 and/or FR2 frequency bands (e.g., as shown in Table 1 above). In some embodiments, the user equipment 74 may transmit the request in response to being disconnected from its preferred frequency layer, but has discovered or determined another frequency layer not permitted for RedCap devices with respect to the base station 72A. For example, the user equipment 74 may transmit the request in response to being redirected to a certain frequency layer (e.g., due to load balancing). The user equipment 74 may also or alternatively transmit the request in response to being operated into a limited service mode, where the user equipment 74 may have found another cell 76 from a same or different network 70 through which it may potentially establish the connection.

At block 192, the base station 72A may determine whether the desired frequency range of the user equipment 74 is within a preferred frequency range of the base station 72A and/or of the network 70. To do so, the base station 72A may access its memory 14 or storage 16 to access stored indications of communication preferences of the network 70 for which the base station 72A is to comply. The base station 72A may compare the stored indications to the desired frequency range indicated by the user equipment 74 to determine if the desired frequency range of the user equipment 74 is compatible with the stored indications that correspond to preferences of the network 70A.

When the desired frequency range falls within the frequency range preferences of the network 70, the base station 72A, at block 194, may establish communication with the user equipment 74 over the desired frequency range. To do so, the base station 72A may follow some of the operations of FIGS. 5-7 (e.g., at least blocks 98-126 of FIG. 5). However, when the desired frequency range falls outside of the frequency range preferences of the network 70A, then the base station 72A, at block 196, may determine whether an indication of an emergency been received from the user equipment 74 (e.g., as part of the random access preamble (MSG1), the RRCSetupRequest (MSG3), a RRCResumeRequest, the UECapabilityInformation (MSG7), and so on). If the indication of an emergency has been received, then the base station 72A proceeds to fulfill the request from the user equipment 74 regardless of its frequency range preferences (e.g., as long as it is capable of fulfilling the request). And thus, operations of method 188 continue at block 194 with the base station 72A establishing communication with the user equipment 74 over the desired frequency range of the user equipment 74. If the indication of an emergency has not been received, then the base station 72A, at block 198, may determine to redirect the request of the user equipment 74 to its preferred frequency range (e.g., if the user equipment 74 is capable of communication using the preferred frequency range). Alternatively, the base station 72A may handover the request of the user equipment 74 to another base station (e.g., 72B) that prefers to communicate using the desired frequency range of the user equipment 74.

In any of these cases, the RedCap user equipment 74 may end up on a frequency layer not permitted for RedCap devices. These barring rules on frequency layers may organize network demand and help to silo user equipment 74 with differing number of RX branches onto different frequency layers. The user equipment 74 may request connection to a frequency layer not permitted for its number of RX branches (e.g., a RedCap device trying to connect to a frequency range designated for devices with 2 RX branches), for example, when the user equipment 74 loses its preferred frequency layer and does not find another frequency layer permitted for its own number of RX branches. Alternatively, the user equipment 74 may request connection to a frequency layer not permitted for its number of RX branches when redirected by the base station 72A to a different frequency layer, such as due to load balancing operations. Furthermore, the user equipment 74 may land on a frequency layer not permitted for its number of RX branches when operating in a limited service mode and when it attempts to connect to an incompatible base station 72. For example, a RedCap user equipment 74 may request connection to a cell 76 that does not support RedCap devices but may still attempt to establish its emergency-related communication with the base station 72 corresponding to the cell 76.

If the user equipment 74 continues to attempt to make the emergency-service access request on the barred frequency layer, the base station 72 may override the barring of the frequency layer and use the frequency layer to fulfill the emergency-service access request. As shown in block 198 of FIG. 8, if the user equipment 74 is not attempting an emergency-service access request, the user equipment 74 remains barred from the frequency layer. This may be captured as a clarification or note in the TS38.300 defining that a RedCap user equipment initiating an emergency call or transmitting an emergency-service access request may ignore the barring rules on frequency layers or in TS38.304 by defining that a cell indicating that a RedCap user equipment 74 may select any cell 76 when the RedCap user equipment 74 is to make an emergency call or emergency request. Furthermore, TS38.331 may define further procedural clarifications that a user equipment 74 may ignore cell 76 barring once transmitting an emergency-service access request (e.g., initiating an emergency call).

It is noted that, as described above, the base station 72A accepts or handovers the request of the user equipment 74. However, it is also noted that when the base station 72A deems the request of the user equipment 74 as incompatible with its preferred operations or operational configurations, the base station 72A may deny the user equipment 74 access as long as the request was not for emergency services. The base station 72A may deny access in several different ways. For example, at block 86, the base station 72A may deny access by not transmitting the UL scheduling information (MSG2). In this way, upon reception and decoding of expanded MSG1, the network may ignore the random access request by the user equipment 74 and not transmit the random access response (MSG2), thereby causing the user equipment 74 to time out and to attempt to access another cell 76. Additionally or alternatively, the base station 72A may deny the request by, upon reception and decoding of the expanded MSG3 RRCSetupRequest, sending an RRCReject message in its contention resolution response MSG4. Furthermore, the base station 72A may yet reject the message after receiving and decoding the UECapabilityInformation message. Indeed, the base station 72A may decide to release or suspend the RRC connection using a RRCRelease message, thereby causing the user equipment 74 to enter an IDLE state and to initiate cell selection procedures.

Some of these described operations may be applied to different received messages. In this way, a first electronic device may follow operations of FIG. 5 with a base station 72A while a second electronic device follows operations of FIG. 6 with the base station 72A. The same applies to operations of FIGS. 5-8. Furthermore, an electronic device may operate to communicate with the base station according to operations of FIG. 5 for a first request and according to operations of FIG. 6 for a later request, and vice versa. In this way, a transceiver 30 may receive a subsequent connection request from another electronic device 10 to establish communication. In response to receiving the subsequent connection request, a base station 72 may determine that the subsequent connection request does not correspond to an urgent service fulfillment (e.g., emergency request) and may redirect the subsequent connection request to the desired frequency range used by the transceiver 30, even if an ongoing or prior communication from the electronic device 10 or a different electronic device 10 was or was not for urgent service fulfillment.

Technical effects of the present disclosure include systems and methods to reduce or eliminate a likelihood that a base station rejects a request from a user equipment on the basis of the number of RX branches the user equipment uses before considering whether the request is for emergency-service access. Several systems and methods may improve handling of emergency requests from user equipment by a base station. In one case, the user equipment may transmit the first indication and the second indication with a random access preamble (MSG1). In another case, the user equipment may transmit the first indication with the RRCSetupRequest (MSG3) and the second indication with the random access preamble (MSG1). In a third case, the base station may transmit the first indication to a target base station when handing over the user equipment requesting emergency access as to not lose the first indication when transferring the user equipment. And, in a fourth case, a base station may fulfill an emergency request of user equipment even when the request was made on a less desired or barred frequency layer of its network. By operating in any of these ways, a likelihood of a base station outright preventing a request from user equipment for network access to an emergency service from being prematurely rejected, thereby improving network operation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:
receiving, via processing circuitry of user equipment, a first indication to transmit a message associated with an emergency-related request on a network;
generating, via the processing circuitry, a connection request comprising a second indication of a number of receive branches of the user equipment based on the first indication, wherein a receiver of the user equipment uses one or more receive branches when communicating on the network;
transmitting, via a transmitter of the user equipment, the connection request to a network communication node associated with the network;
receiving, via the processing circuitry, a third indication corresponding to the network communication node ending a connection; and
transmitting, via the processing circuitry, the message on the network via an additional network communication node based on the third indication.

2. The method of claim 1, comprising:
generating, via the processing circuitry, a setup request comprising a fourth indication indicating that the connection request is associated with the emergency-related request; and
transmitting, via the transmitter, the setup request to the network communication node.

3. The method of claim 2, comprising:
receiving, via the receiver, a contention resolution response from the network communication node, the network communication node generating the contention resolution response based on determining to fulfill the connection request; and
communicating, via the transmitter or the receiver, with the network communication node based on the contention resolution response.

4. The method of claim 2, wherein the second indication comprises an indication of an emergency establishment cause, a mps-Priority Access establishment cause, a mcs-Priority Access establishment cause, or any combination thereof.

5. The method of claim 1, comprising determining, via the processing circuitry, that the network communication node ended a connection before transmitting a setup request to the network communication node.

6. The method of claim 1, wherein generating, via the processing circuitry, the connection request comprises generating, via the processing circuitry, the connection request to include the second indication indicating one receive branch.

7. The method of claim 1, wherein generating, via the processing circuitry, the connection request comprises generating, via the processing circuitry, the connection request to be sent on a connection with the network communication node using a frequency between 0.41 gigahertz (GHz) and 7.125 GHz.

8. The method of claim 1, comprising receiving, via the receiver, a fifth indication that the network communication node has handed over the connection request to an additional network communication mode before receiving, via the receiver, a contention resolution response from the network communication node.

9. A network communication node, comprising:
a transceiver;
a memory configured to store a first indication of a preferred frequency range of the transceiver corresponding to a frequency range assigned by a network provider to the transceiver; and
processing circuitry configured to
receive, via the transceiver, a connection request from user equipment, the connection request corresponding to a second indication of an only one receive branch,
determine to accept the connection request based on a third indication that communication with the only one receive branch is supported by the transceiver,
generate a contention resolution response to establish a connection with the user equipment based on accepting the connection request and the preferred frequency range, and
transmit, via the transceiver, the contention resolution response to the user equipment.

10. The network communication node of claim 9, wherein the transceiver is configured to transmit the contention resolution response to the user equipment using a connection on a frequency between 0.41 gigahertz (GHz) to 7.125 GHz.

11. The network communication node of claim 9, wherein the processing circuitry is configured to receive, via the transceiver, the connection request from the user equipment at least in part by receiving, via the transceiver, a random access preamble from the user equipment, the random access preamble comprising the second indication.

12. The network communication node of claim 9, wherein the processing circuitry is configured to
in response to receiving, via the transceiver, the connection request,
determine that a reduced number of receive branches was indicated via the second indication by the user equipment.

13. The network communication node of claim 12, wherein the processing circuitry is configured to transmit, via the transceiver, an uplink scheduling information packet to the user equipment based on determining that the reduced number of receive branches was indicated.

14. The network communication node of claim 9, wherein the processing circuitry is configured to
determine to handover the user equipment to an additional network communication node after ongoing communications with the user equipment,
request a system information block (SIB) from the additional network communication node,
determine that the additional network communication node supports requests related to emergency-service access, and
handover the user equipment to the additional network communication node.

15. A network communication node, comprising:
a transceiver;
a memory configured to store a first indication of a preferred frequency range of the transceiver corresponding to a frequency range assigned by a network provider to the transceiver; and
processing circuitry configured to
receive, via the transceiver, a random access preamble from user equipment corresponding to a connection request, the random access preamble comprising a second indication of a number of receive branches associated with the user equipment,
determine that the number of receive branches corresponds to a reduced number of receive branches, and
transmit, via the transceiver, uplink scheduling information to the user equipment based on determining that the number of receive branches corresponds to the reduced number of receive branches and the preferred frequency range.

16. The network communication node of claim 15, wherein the processing circuitry is configured to
receive, via the transceiver, a third indication from the user equipment indicating that the connection request is associated with an emergency based on the uplink scheduling information,
determine to fulfill the connection request based on the third indication; and
transmit, via the transceiver, a contention resolution response to the user equipment based on determining to fulfill the connection request.

17. The network communication node of claim 15, wherein the processing circuitry is configured to
after determining that the number of receive branches corresponds to the reduced number of receive branches, determine not to end a connection with the user equipment based on the first indication; and
generate the uplink scheduling information based on determining to not end the connection with the user equipment and the preferred frequency range of the transceiver.

18. The network communication node of claim 17, wherein the processing circuitry is configured to
receive, via the transceiver, a subsequent connection request from another user equipment to establish communication,
determine that the subsequent connection request does not correspond to an urgent service fulfillment based on receiving the subsequent connection request, and
redirect the subsequent connection request to use the preferred frequency range used by the transceiver.

19. The network communication node of claim 18, wherein the urgent service fulfillment comprises a fourth indication of an emergency establishment cause, a multimedia priority service establishment cause, a mission critical service establishment cause, or any combination thereof.

20. The network communication node of claim 15, wherein the transceiver is configured to transmit the uplink scheduling information to the user equipment using a connection on a frequency between 0.41 gigahertz (GHz) to 7.125 GHz.

* * * * *